United States Patent
Koljonen et al.

(10) Patent No.: US 6,574,358 B1
(45) Date of Patent: *Jun. 3, 2003

(54) AUTOMATIC TRAINING OF INSPECTION SITES FOR PASTE INSPECTION

(75) Inventors: Juha Koljonen, Needham, MA (US); Leonid Taycher, Brighton, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/435,637

(22) Filed: Nov. 8, 1999

Related U.S. Application Data

(60) Provisional application No. 60/108,431, filed on Nov. 13, 1998.

(51) Int. Cl.⁷ .................................................. G06K 9/00
(52) U.S. Cl. ........................................ 382/147; 382/151
(58) Field of Search ................................ 382/144, 145, 382/141, 151, 160, 147, 155; 706/48; 348/126, 87

(56) References Cited

U.S. PATENT DOCUMENTS

| | | | |
|---|---|---|---|
| 5,757,956 A | * 5/1998 | Koljonen et al. ........... 382/151 |
| 5,818,443 A | 10/1998 | Schott | |
| 5,859,923 A | 1/1999 | Petry | |
| 5,912,984 A | 6/1999 | Michael | |
| 5,949,905 A | * 9/1999 | Nichani et al. ............. 382/173 |
| 6,269,179 B1 | * 7/2001 | Vachtsevanos et al. ..... 382/149 |
| 6,317,513 B2 | * 11/2001 | Michael et al. ............. 382/145 |

* cited by examiner

*Primary Examiner*—Amelia M. Au
*Assistant Examiner*—Virginia Kibler
(74) *Attorney, Agent, or Firm*—Russ Weinzimmer

(57) ABSTRACT

A method of training a system to identify inspection sites on a circuit board is described. The method uses a priori information, which includes a region of interest, approximate sizes and approximate spacings of a plurality of nominal pad locations, and a pad count or an aperture count. A region is created which is associated with each one of the nominal pad locations within an image of a printed circuit board. A search tool is run to find pad candidates within each one of the regions. The pad candidates are filtered. The best pad candidates are selected from among each of the found pad candidates. The best pad candidates are averaged to provide an average, and are modified based on the average.

8 Claims, 3 Drawing Sheets

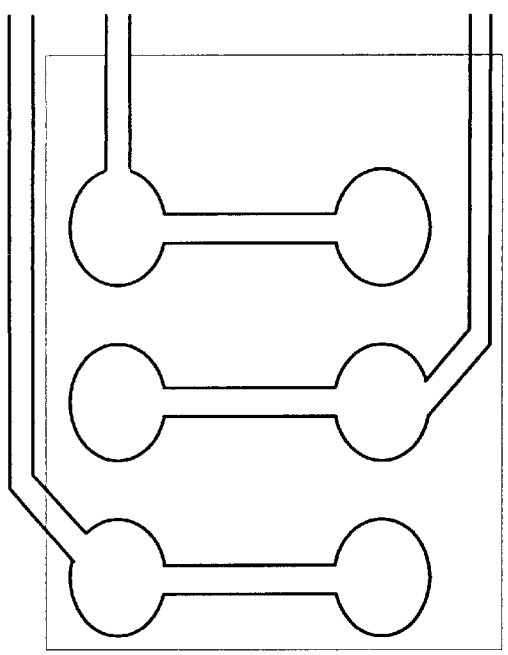
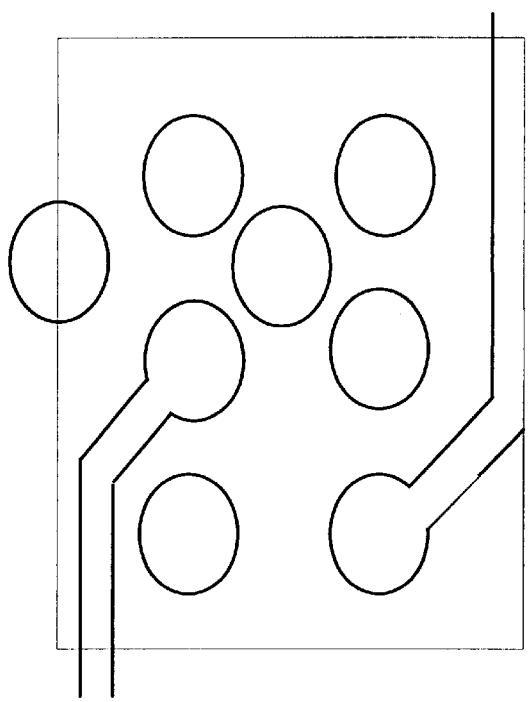
Figure 1A					Figure 1B
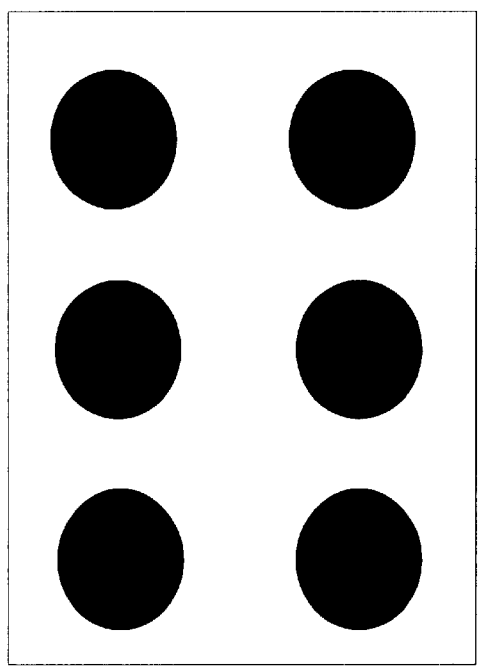
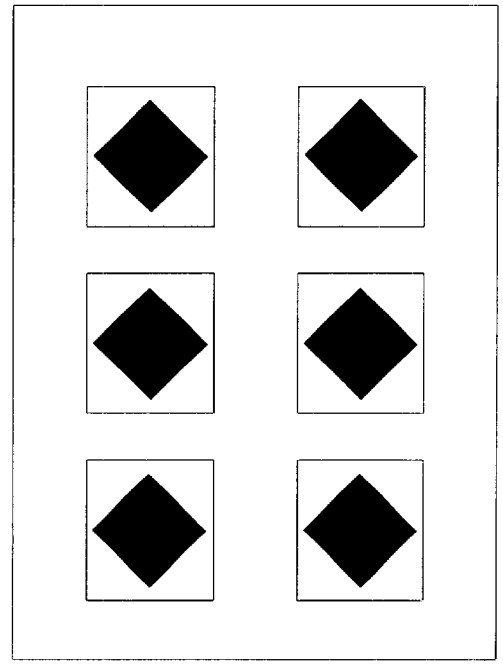
Figure 2A					Figure 2B

AUTOMATIC TRAINING OF INSPECTION SITES FOR PASTE INSPECTION

RELATED APPLICATION DATA

This application claims the benefit of priority from U.S. Provisional Patent Application No. 60/108,431, filed in the names of Juha Koljonen and Leonid Taycher, on Nov. 13, 1998.

BACKGROUND OF THE INVENTION

1. Field of the Invention

The present invention relates to machine vision and automated inspection systems, and more particularly to a method and apparatus for inspection of a solder paste screen printed on printed circuit boards using a stencil.

2. Description of Background Information

One method of assembling printed circuit boards (PCBs) requires solder paste to be applied to the printed circuit board before components, such as integrated circuits and discrete devices, are placed and ultimately secured onto the board. Initially, the sticky solder paste temporarily holds the components in place on the PCB until the solder paste is melted or re-flowed. When the solder paste is re-flowed, it forms both mechanical and electrical connections between the components and the board. If there is not enough solder paste present, components may be inadequately connected to the PCB. If there is too much solder paste, or if solder paste is deposited in the wrong place, an extra electrical connection or short is formed. This is generally referred to as a solder bridge.

Automated processes for fabricating PCBs are generally known, including process steps for applying solder paste to circuit boards using screen-printing techniques. Prior to printing, a thin metal stencil or template is constructed with openings or apertures matching appropriate places on the PCB where paste should be printed; typically bond pads. During printing, the stencil is aligned to the PCB. The solder paste is then applied to the PCB through the stencil openings by using a squeegee to spread the paste. Then the stencil is lifted off the PCB and the PCB is transported to the next step in the assembly process.

Automatic inspection or vision systems may be used to detect problems in the printing process, including problems associated with the stencil and problems associated with the application of paste to the PCB. Stencil problems are usually in the form of blocked stencils or paste adhering to the bottom of the stencil (smear). It is usually desirable to detect stencil blockage and smear before any clean circuit boards are misprinted. Misalignment of the stencil and PCB may be detectable prior to the distribution of solder paste by inspection of the stencil position relative to the PCB before printing thereon. The PCB can be inspected to detect incorrect solder paste distribution after printing. Automatic inspection may be used to determine if there is too little solder paste, too much solder paste or solder paste in the wrong places on the printed circuit board.

The automated inspection of solder paste on PCBs is inherently difficult to accomplish. The solder paste is difficult to identify on the PCB because it is variable in terms of its appearance as imaged by the imaging system. The paste appearance varies over time, e.g., wet paste has a different appearance than dry paste. The paste has texture and the gray level reflectance of the paste is similar to bonding pads with tinning and other circuitry on the PCB. Also, the three-dimensional shape of the paste causes shadowing and other variable imaging as the paste moves under the lighting. The inherent difficulty is exacerbated by variability from one PCB to the next. For example, the color of circuit boards of a single type in one printing can vary from light green to dark green or blue. In one printing run, the relative positioning of portions or all of a PCB of a single board type may vary with respect to the stencil or solder mask on the board. Additionally, all of the circuitry on a board is subject to dimensional variability. Perhaps, most significantly, the solder paste deposited on a board can obscure bond pads beneath it making it impossible to tell either what is beneath the solder paste or what is the relative alignment of the solder paste to the pads.

Known in-line or automated inspection systems for solder paste inspection do not adequately overcome such difficulties. Some known systems typically perform inspection by selecting gray level thresholds to segment paste from other regions by gray level. This is typically known as binarization (for two gray levels) or trinarization (for three gray levels). All pixels with gray levels between two thresholds are labeled as paste because the pads are usually the brightest objects in the image and boards are the darkest. The paste gray levels are typically somewhere in the middle.

To accomplish the above inspection, one distinguishes between the pads and other regions of the circuit board. Similarly, on the stencil, one needs to locate the aperture regions. To do this, one common mode of operation is to generate a model or parametric description of an inspection site. The purpose of this model is to be able to find pads and apertures at inspection time. This model is typically created by analyzing a representative image of a clean circuit board and stencil.

SUMMARY

This invention is a method for creating a parametric model of board and stencil inspection sites. This technique generates the models by analysis of an image of a representative circuit board and/or stencil with little aid from a human operator.

This invention overcomes several problems with current methods of paste inspection. One known method for generating inspection site models is using binarization. This assumes that pads are brighter than everything else on the circuit board and picks a gray level threshold that segments the pad regions by gray level. Similarly on the stencil side, aperture regions are assumed to be the darkest regions in the image. This method is inaccurate and prone to error. Circuit boards have many confusing regions and stencils have a shiny metallic surface that does not image well with confusing surface texture. Also, picking a good threshold is very difficult when an image has many gray levels such as a circuit board.

Terminology

Inspection site—This is a region of the circuit board and/or the stencil that is chosen for inspection. Typically, an inspection site contains a number of bonding pads and/or stencil apertures. The magnification and resolution of the optical system determine the size of the site as imaged by the acquisition system.

Printing—Refers to the printing of solder paste on a circuit board. Pre-print refers to the point in the time in the printing cycle before printing where the circuit board is clean and free of solder paste. Post-print refers to the point in time after printing.

Training—This refers to the process of producing a model or description of an inspection site. This is typically done by the operator defining a region of interest in the image and then analyzing that image, where the region of interest can be apertures on the stencil or pads on the circuit board, for example. Preferably, the model is a parametric geometric model that contains terms from which a geometric representation can be constructed. For instance, a parametric model of part of a circuit board having three rectangular pads is $\{w_{pcb}, h_{pcb}, <loc_1, w_1, h_1>, <loc_2, w_2, h_2>, <loc_3, w_3, h_3>\}$, where $w_{pcb}$ and $h_{pcb}$ are the width and height of the inspection site, respectively, $loc_n$ is the location of the $n^{th}$ pad, and $w_n$ and $h_n$ is the width and height of the $n^{th}$ pad. A parametric model is advantageous over an image model because it requires less stored data, and because regions of interest, such as pads, have already been located and, therefore, de-emphasizes extraneous features in the image which could otherwise confuse the inspection method.

Inspection sites, printing, and training are further described in U.S. Pat. No. 5,912,984, titled "Method and Apparatus for In-Line Solder Paste Inspection", issued on Jun. 15, 1999, in the names of D. Michael, J. Koljonen, S. Nichani, and P. Roberts.

BRIEF DESCRIPTION OF THE DRAWINGS

The invention is described with reference to the following drawings in which:

FIGS. 1A and 1B show a printed circuit board having pad candidates modeled by circular shapes;

FIGS. 2A and 2B show a stencil having aperture openings modeled by a circular shape (FIG. 2A) and a rectangular shape (FIG. 2B), respectively;

DETAILED DESCRIPTION

Figure 3:
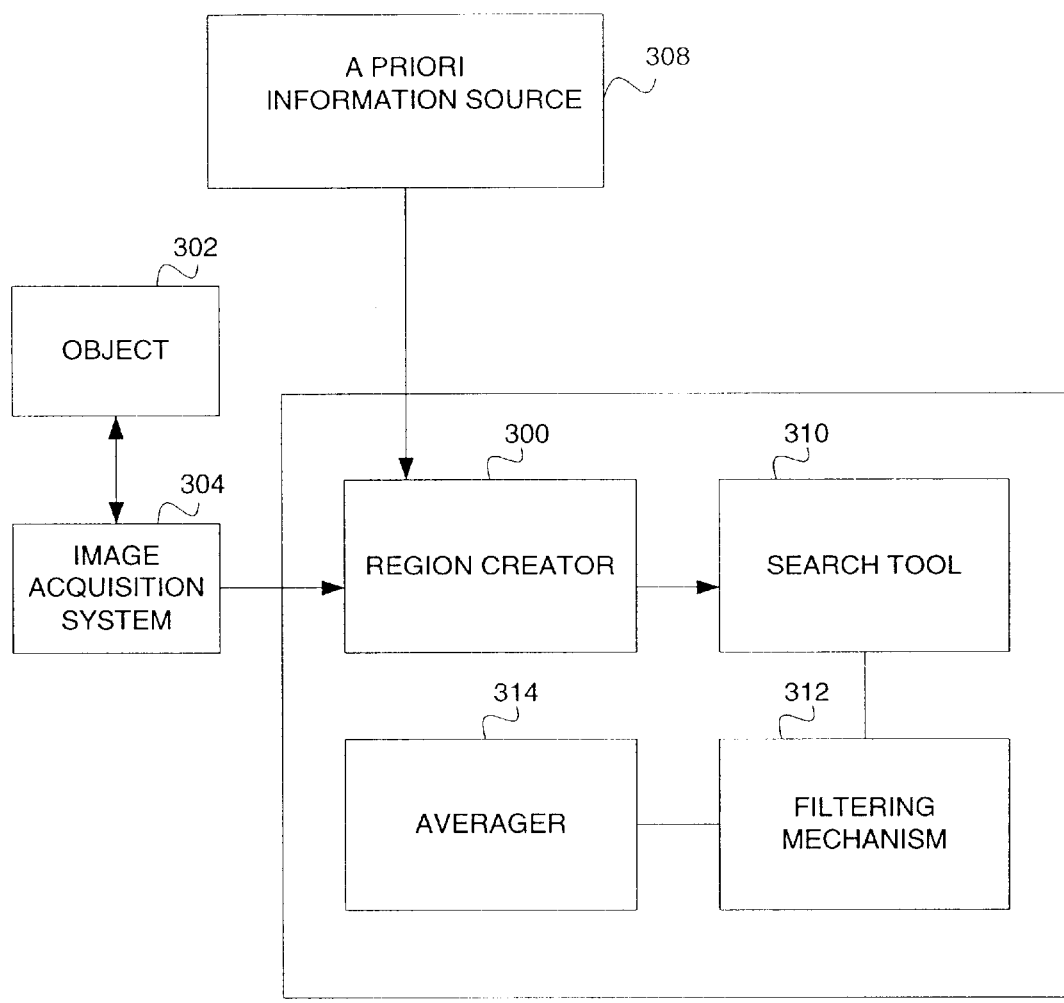
FIG. 3 is a functional diagram for explaining the functioning of the invention.

The same basic technique can be used for training a system for both circuit boards and stencils. Board training is covered first and then the differences between board training and stencil training is explained.

The illustrated embodiment method of circuit board training uses the following a priori information: 1) a region of interest (which can be the entire acquired image); and 2) an approximate size and spacing of pads. The region of interest can be set by an operator or determined from a CAD description of the board. The approximate size and spacing can be determined from the stencil side training. Call these the nominal pad locations. In many cases, there is a relationship between aperture sizes and pad sizes; however, aperture sizes are typically not the same as the pads. For example, the aperture size can be as small as ½ the size of a pad or two-times the size of the pad. Accurate inspection, however, requires that the pad sizes in the model be close to the actual pad sizes. Therefore, the coarse information is refined in the next steps.

The goal of the training is to create almost exact pad descriptions within the site model. This description contains the location of each pad within the site and its size and shape, which is the parametric model. It is done using the above a priori information (e.g., coarse size and spacing of the pads and identified regions of interest) and a search tool in the following steps:

1) Create a window around each nominal pad location within the image.
2) Within each window, run a search tool, such as the PATMAX search tool, sold by Cognex Corporation, Natick Mass., to locate pad candidates.
3) Filter the pad candidates to pick one candidate for each window.
4) Average and modify the pads found with respect to size and position.

The window in step 1 is set so that there is a generous tolerance allowed for the error in the nominal pad location and size. For instance, if the nominal pad size is 1×1 and the scale error is 3, then the window should be set to be 3×3 to accommodate the error in scale. The scale error is typically derived from user input and is the anticipated range between the size of the aperture to the size of the pad. Also note that when using the aperture as the reference for the nominal pad size there can also be a scaling. Apertures may be known to be ½ the size of the pad. The search windows should be set appropriately.

The pad shape may be unknown. To determine the pad shape, the search tool in step 2 runs a number of model shapes and chooses the shape with the best score or best match.

A vision tool such as the PATMAX search tool and the PATQUICK search tool, both sold by Cognex Corporation of Natick, Mass. can perform the pattern recognition in the image. The PATMAX search tool accurately locates objects by analyzing objects as geometric shapes as opposed to using pixel grids of gray values, as used by prior art systems. These search tools can locate objects that appear different from the model in translation, scale and aspect ratio.

The leeway in translation, scale and aspect ratio accommodates for error in the coarse location information, and accommodate for changes in shape of the pads. For regions other than circles, the tools ability to find objects regardless of rotation may also be important.

Alternately, other methods such as a correlation search, as known in the art, can run a multitude of models of different sizes and shapes and choose the size and shape with the best score.

Although the models could be of the same shape as the pads, the embodiment presumes that rectangular and circular models approximate all current pads sufficiently for many applications. Even circuit traces formed on the sides of the pads can be addressed by the rectangular and circular models of the method.

Each application dictates the reasonableness of the model. However, rectangle and circle models allow the pad image sites to be located accurately enough to perform the next steps, such as registration of geometric model to actual image, for instance.

Several examples of pads and apertures that can be modeled using rectangles and circles are shown in FIGS. 1A, 1B, 2A and 2B. FIGS. 1A and 1B show examples of a PCB having pad candidates and FIGS. 2A and 2B show examples of a stencil having aperture candidates modeled using circles (FIG. 2A) and rectangles (FIG. 2B).

For rectangular models, the search must be able to accommodate changes in scale, aspect ratio, and translation enough at least to accommodate for error. If, however, the search tool cannot accommodate all three degrees of freedom, more models can be used to make up the difference as described earlier, e.g., models of multiple scales can be used. The same applies for rotation.

For circular pads, the degrees of freedom are scale and translation.

The filtering of multiple results is done by measuring features of the candidate pads. One such feature is standard deviation of gray level within the pad region. Pads typically appear as a single solid color. Confusing features could be circuit etches or feed through holes. The real pads would have a smaller standard deviation than ones with confusing features.

Pads within a single QFP (quad flat pack) or BGA (ball grid array) part are typically all the same size and spaced regularly. The pad sizes and locations are averaged to come up with a more ideal inspection site description. The intent is to correct minor deviations that may occur on individual boards.

The above board training uses the results of stencil training because typically stencils have less confusion and are easier to train. To apply the technique to stencils, the training procedure for stencils to generate the coarse information can be paired down. To train stencils one would first run a coarser stencil training such as the binarization method discussed above. The results from coarse training would then be used to generate the nominal aperture windows as an input to the method described here.

FIG. 3 shows a functional diagram of an embodiment of the invention. FIG. 3 shows image processing system 300. Image acquisition system 304 acquires a digital image of object 302. The digital image is input into image processing system 300 where it is received for processing by region creator 306. Region creator 306 receives a priori information from an a priori information source 308. The a priori information includes course information of a size and location of areas to search for pad candidates. Region creator 306 separates out a region by defining a window around each nominal pad location within the image.

Search tool 310 uses window information and information concerning nominal pad locations within the image in order to locate pad candidates.

Filtering mechanism 312 filters the pad candidates to pick one best pad candidate for each window.

Averager 314 averages and modifies the size of the best pad candidates within each window, with respect to size and position as each r4espective best pad candidate relates to other best pad candidates in the inspection site.

Figure 4:
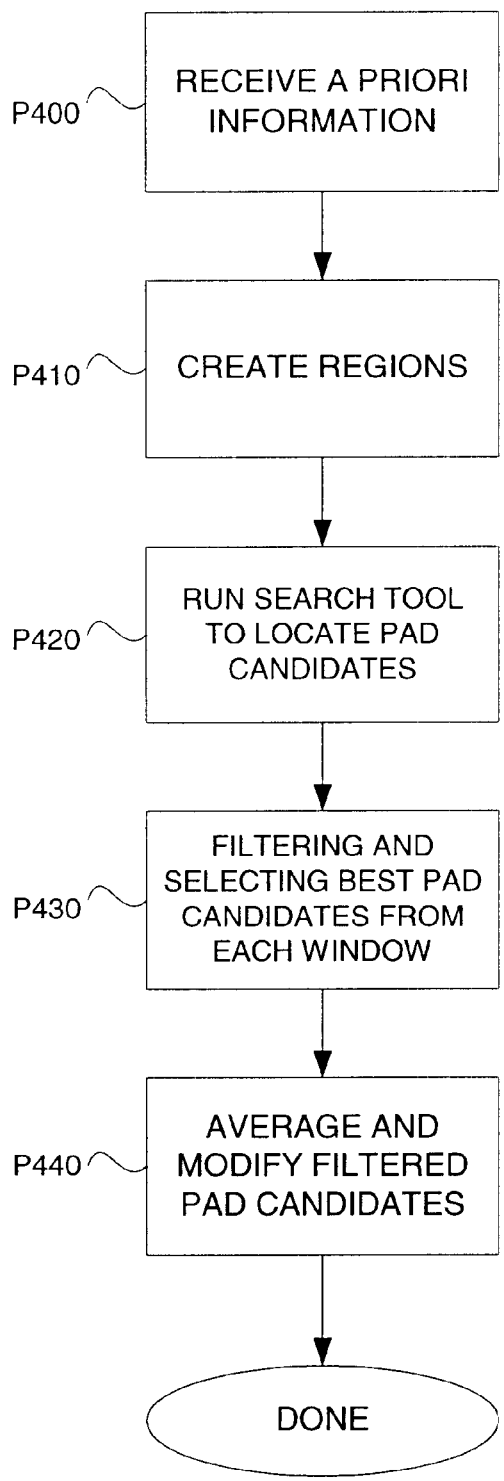
FIG. 4 is a flowchart which helps to explain the process of training the system to identify inspection sites.

FIG. 4 shows a flowchart which describes an example embodiment of the process. At P400, a priori information is received. The a priori information includes information such as a region of interest and approximate sizes and spacings of nominal pad locations.

In P410, a window is created around each of the nominal pad locations within an image of an object, for example a printed circuit board.

In P420, a search tool is run to locate pad candidates. The search tool may be, for example, the PATMAX search tool or the PATQUICK search tool. Both search tools are sold by Cognex Corporation of Natick, Mass. Alternately, a correlation search, as it is well known in the art, may be run using a multitude of models of different sizes and shapes.

In P430, filtering is performed by measuring features of the pad candidates. One such feature, for example, is standard deviation of gray level within a pad region. All pad candidates within a region, but for a pad candidate having a smallest standard deviation of gray level, are excluded by the filter.

In P440, the size of the pad candidates is averaged and the size of the best pad candidate is modified based on the average. This provides a more ideal inspection site description because pads within a single QFP or BGA part are typically all the same size and are regularly spaced.

Although the invention has been shown and described with respect to exemplary embodiments thereof, various other changes, omissions and additions in the form and detail thereof may be made therein without departing from the spirit and scope of the invention, such as the training of a model refinement of other regions of interest similar to at least a portion of the various geometries of pads.

What is claimed is:

1. A method for training a system to locate inspection sites on a circuit board, the method comprising:

using a priori information including a region of interest, approximate sizes and approximate spacings of a plurality of nominal pad locations, and one of a pad count and an aperture count to create a region associated with each one of the plurality of nominal pad locations within an image of a printed circuit board;

running a search tool to find pad candidates within each one of the regions;

filtering the found pad candidates to select best pad candidates from among each of the found pad candidates; and averaging the best pad candidates to provide an average and modifying the best pad candidates based on the average.

2. The method of claim 1, wherein at least some of the a priori information is derived from analyzing a size and a location of each of a plurality of aperture openings in a stencil.

3. The method of claim 1, wherein at least some of the a priori information is derived from known aperture patterns based on design data.

4. The method according to claim 1, wherein a size of each of the regions is based on a nominal aperture size and a scale error.

5. The method according to claim 1, wherein the running the search tool comprises:

determining a pad shape by running the search tool with a predetermined number of model shapes and choosing one of the predetermined number of model shapes having a best match.

6. The method according to claim 5, wherein the running the search tool further comprises:

determining a size of a pad by running the search tool with a predetermined number of model sizes and choosing one of the predetermined number of model sizes having a best match.

7. The method according to claim 5, wherein the predetermined number of model shapes includes at least one of a circular shape and a rectangular shape.

8. The method according to claim 1, wherein the filtering comprises:

measuring a standard deviation of gray level of each of the pad candidates within each of the regions; and selecting a respective best pad candidate for each region by selecting a respective pad candidate having a lowest standard deviation of gray level within a respective region.

* * * * *